US012355673B2

(12) United States Patent
Wang

(10) Patent No.: US 12,355,673 B2
(45) Date of Patent: Jul. 8, 2025

(54) PACKET FORWARDING METHOD, PACKET FORWARDING APPARATUS AND ELECTRONIC DEVICE

(71) Applicant: NEW H3C TECHNOLOGIES CO., LTD., Zhejiang (CN)

(72) Inventor: Wei Wang, Beijing (CN)

(73) Assignee: NEW H3C TECHNOLOGIES CO., LTD., Zhejiang (CN)

( * ) Notice: Subject to any disclaimer, the term of this patent is extended or adjusted under 35 U.S.C. 154(b) by 295 days.

(21) Appl. No.: 18/003,485

(22) PCT Filed: Nov. 27, 2020

(86) PCT No.: PCT/CN2020/132102
§ 371 (c)(1),
(2) Date: Dec. 27, 2022

(87) PCT Pub. No.: WO2022/109986
PCT Pub. Date: Jun. 2, 2022

(65) Prior Publication Data
US 2023/0254263 A1 Aug. 10, 2023

(51) Int. Cl.
*H04L 41/08* (2022.01)
*H04L 45/00* (2022.01)
(Continued)

(52) U.S. Cl.
CPC .............. *H04L 47/52* (2013.01); *H04L 45/34* (2013.01); *H04L 47/283* (2013.01); *H04L 47/36* (2013.01)

(58) Field of Classification Search
CPC ....... H04L 45/34; H04L 45/64; H04L 47/283; H04L 47/36; H04L 47/52; H04L 47/562
See application file for complete search history.

(56) References Cited

U.S. PATENT DOCUMENTS 5,598,417 A  1/1997  Crisler et al.
7,274,696 B1  9/2007  Sikdar
(Continued)

FOREIGN PATENT DOCUMENTS

CN    1897566 A   1/2007
CN  101442495 A   5/2009
(Continued)

OTHER PUBLICATIONS

Zhang, W. et al., "An Improved Least-Laxity-First Scheduling Algorithm of Variable Time Slice for Periodic Tasks," Proceedings of the 6th IEEE International Conference on Cognitive Informatics, Oct. 8, 2017, Lake Tahoe, California, 6 pages.
(Continued)

Primary Examiner — Phuc H Tran
(74) Attorney, Agent, or Firm — McCoy Russell LLP

(57) ABSTRACT

The embodiments of the present disclosure provide a packet forwarding method, a packet forwarding apparatus, and an electronic device. In the embodiments of the present disclosure, by setting up a corresponding outbound-interface-direction-queue scheduling period for the outbound interface on the network device, a number of time slices in the outbound-interface-direction-queue scheduling period, and a length of one time slice, and allocating corresponding time slices in the outbound-interface-direction-queue scheduling period to the outbound-interface-direction queues corresponding to the outbound interface, such that the network device can schedule, on each time slice in the outbound-interface-direction-queue scheduling period, packets in the outbound-interface-direction queue corresponding to the time slice. This can realize that the delay of waiting for scheduling outbound-interface-direction queues is maintained between the worst delay and the best delay as discussed above, realize deterministic delay of waiting for (Continued)

scheduling outbound-interface-direction queues, and thus realize deterministic delay of packet forwarding.

17 Claims, 5 Drawing Sheets

(51) Int. Cl.
*H04L 47/283* (2022.01)
*H04L 47/36* (2022.01)
*H04L 47/52* (2022.01)

(56) References Cited

U.S. PATENT DOCUMENTS

| | | | |
|---|---|---|---|
| 2005/0089054 | A1 | 4/2005 | Ciancaglini et al. |
| 2005/0111470 | A1* | 5/2005 | Memarzadeh ...... H04L 65/1101 |
| | | | 375/E7.025 |
| 2008/0186989 | A1 | 8/2008 | Kim |
| 2016/0211983 | A1 | 7/2016 | Zhang et al. |
| 2021/0266651 | A1* | 8/2021 | Luo .................. H04L 43/20 |
| 2024/0137272 | A1* | 4/2024 | Gao .................. H04L 41/0816 |

FOREIGN PATENT DOCUMENTS

| | | |
|---|---|---|
| CN | 101651614 A | 2/2010 |
| CN | 102083207 A | 6/2011 |
| CN | 106506108 A | 3/2017 |
| CN | 108282415 A | 7/2018 |
| CN | 102223306 B | 10/2018 |
| CN | 109246023 A | 1/2019 |
| CN | 109639595 A | 4/2019 |
| CN | 110099013 A | 8/2019 |
| CN | 111431822 A | 7/2020 |
| JP | 2003244220 A | 8/2003 |
| JP | 2006186789 A | 7/2006 |
| JP | 2008514145 A | 5/2008 |
| WO | 2016015187 A1 | 2/2016 |
| WO | 2020136843 A1 | 7/2020 |

OTHER PUBLICATIONS

Anthony et al., "UNiS: A User-space Non-intrusive Workflow-aware Virtual Network Function Scheduler," Proceedings of the 2018 14th International Conference on Network and Service Management, Nov. 5, 2018, 9 pages.

Du, J.,"Simulation Research on Key Technologies of Time Sensitive Network," China Excellent Master's Dissertation Full-text Database, Feb. 15, 2020, 95 pages.

Kumar, G. et al., "Coupling Source Routing with TimeSensitive Networking," Proceedings of the 2020 IFIP Networking Conference, Jun. 22, 2020, Paris, France, 6 pages.

ISA State Intellectual Property Office of the People's Republic of China, Written Opinion of the International Searching Authority Issued in Application No. PCT/CN2020/132102, Jul. 30, 2021, WIPO, 8 pages.

State Intellectual Property Office of the People's Republic of China, Office Action and Search Report Issued in Application No. 202080003397.3, Apr. 26, 2023, 13 pages. (Submitted with Machine Translation).

European Patent Office, Extended European Search Report Issued in Application No. 20962877.5, Jun. 5, 2023, Germany, 14 pages.

State Intellectual Property Office of the People's Republic of China, Office Action and Search Report Issued in Application No. 202080003397.3, Feb. 7, 2024, 12 pages. (Submitted with Machine Translation).

ISA State Intellectual Property Office of the People's Republic of China, International Search Report Issued in Application No. PCT/CN2020/132102, Jul. 30, 2021, WIPO, 4 pages.

\* cited by examiner

PACKET FORWARDING METHOD, PACKET FORWARDING APPARATUS AND ELECTRONIC DEVICE

CROSS-REFERENCE TO RELATED APPLICATIONS

The present application is a U.S. National Phase of International Application No. PCT/CN2020/132102, filed on Nov. 27, 2020. The entire contents of the above-listed application are hereby incorporated by reference for all purposes.

TECHNICAL FIELD

The present disclosure relates to network communication technology, and in particular to a packet forwarding method, a packet forwarding apparatus, and an electronic device.

BACKGROUND

In a so-called deterministic network, one of the core goals is to realize a deterministic delay in packet forwarding to guarantee end-to-end delay. In a conventional network, packets are forwarded by routers based on a store-and-forward mechanism, which can improve bandwidth utilization.

However, the conventional store-and-forward mechanism only pays attention to the forwarding of packets, and does not take into account the delay of packet forwarding. It is difficult to meet the requirement of deterministic delay and cannot guarantee end-to-end delay.

DETAILED DESCRIPTION OF THE EMBODIMENTS

Figure 1:
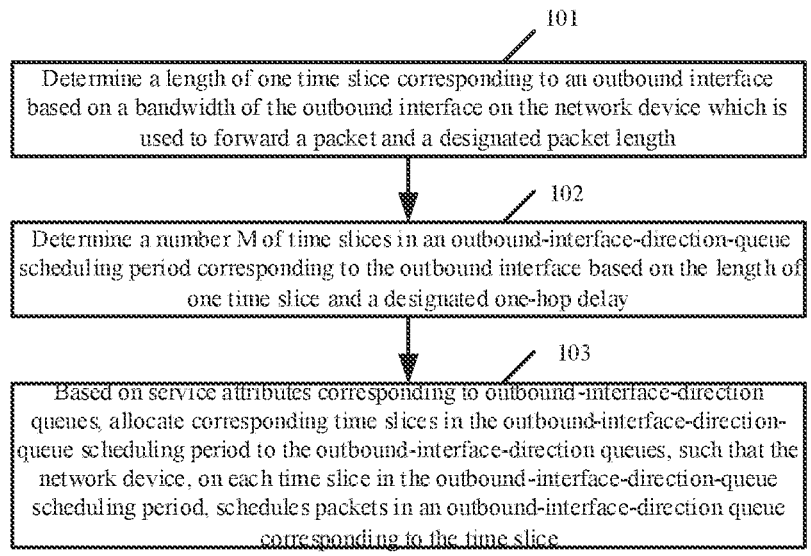
FIG. 1 is a flowchart of a method provided by an embodiment of the present disclosure.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terminology used in the present disclosure is for the purpose of describing a particular example only, and is not intended to be limiting of the present disclosure. The singular forms such as "a", "said", and "the" used in the present disclosure and the appended claims are also intended to include multiple, unless the context clearly indicates otherwise. It is also to be understood that the term "and/or" as used herein refers to any or all the possible combinations that include one or more associated recited items.

It should be appreciated that although different information may be described using the terms such as first, second, third, etc. in the present disclosure, such information should not be limited to these terms. These terms are used only to distinguish the same type of information from each other. For example, the first information may also be referred to as the second information without departing from the scope of the present disclosure, and similarly, the second information may also be referred to as the first information. Depending on the context, the word "if" as used herein may be interpreted as "when" or "as" or "determining in response to".

In order to make the present disclosure easier to understand, the following describes the possible delay in the process of packet forwarding.

Delay in inbound packet processing. The delay mainly occurs in inbound packet processing logic such as identifying the header of the packet and the packet look-up table, which depends on performance of the software or hardware that executes the inbound packet processing logic. In specific implementation, once the software or hardware that executes the inbound packet processing logic is deterministic, the delay in corresponding inbound packet processing is also deterministic. In other words, the delay in inbound packet processing is a fixed value.

Delay during a packet is being transmitted to an outbound link. The delay is mainly due to the influence of link speed and occurs during a packet is being transmitted to the link connected to the outbound interface, which depends on the bandwidth of the outbound interface. In specific implementation, the bandwidth of the outbound interface may be previously configured, and accordingly, the delay of the packet being transmitted to the link connected to the outbound interface can also be determined based on the previously configured bandwidth of the outbound interface. In other words, the time delay for sending a packet to the link connected to the outbound interface is a fixed value.

Transmission delay of a packet from a start point to an end point: The transmission delay is mainly caused by the distance when the packet is transmitted from the start point to the end point, which depends on the physical characteristics such as transmission distance and transmission speed. In specific implementation, the transmission delay of the packet from the start point to the end point is a fixed value.

Delay of waiting for scheduling outbound-interface-direction queues. It is mainly a delay from when a packet is placed into an outbound-interface-direction queue to when the packet is scheduled to be forwarded from the outbound-interface-direction queue. The reason for the delay is that the packet cannot be transmitted immediately after receiving the packet and completing the routing for the packet. The reason why the packet cannot be transmitted immediately is because there are already other packets in the queue waiting to be transmitted, and it is necessary to wait for the other packets in front thereof to finish transmission before the packet can be transmitted. The waiting time for other packets to be transmitted is unpredictable, so the delay of waiting for scheduling outbound-interface-direction queues is also unpredictable. However, the delay of waiting for scheduling outbound-interface-direction queues cannot be predicted, so the delay of packet forwarding cannot be determined, and the deterministic network cannot be realized.

In order to determine the delay of waiting for scheduling outbound-interface-direction queues, an embodiment of the present disclosure provides the following process shown in FIG. 1.

Refer to FIG. 1, which is a flowchart of a method provided in an embodiment of the present disclosure. This process is performed by a management device. The management device is configured to manage at least one network device. Optionally, the management device may be an SDN controller. Correspondingly, the network device may be an SDN device such as an SDN switch, which is not specifically limited in the embodiment.

As shown in FIG. 1, the process can include the following steps.

Step 101, a length of one time slice corresponding to an outbound interface is determined based on a bandwidth of the outbound interface on the network device which is used to forward a packet and a designated packet length.

Optionally, the outbound interface can be an interface connected to an upstream device or network (it can be referred to as a network side interface).

Time slicing is a new concept introduced in the embodiments of the present disclosure. The purpose of introducing time slicing is to divide the outbound-interface-direction-queue scheduling period corresponding to the outbound interface, as described at step 102. As for how to determine the length of one time slice, an example will be described later, which will not be elaborated here.

Step 102, a number M of time slices in an outbound-interface-direction-queue scheduling period corresponding to the outbound interface is determined based on the length of one time slice and a designated one-hop delay.

Optionally, the outbound-interface-direction-queue scheduling period is used to schedule N outbound-interface-direction queues corresponding to the outbound interface. N is greater than or equal to 1, which can be specifically determined based on the performance of the network device. Here, packets in each outbound-interface-direction queue are forwarded through the outbound interface. In an example, different outbound-interface-direction queues correspond to different service attributes. As an embodiment, the service attribute can be a forwarding equivalence class of the service (it can be realized by a quintuple, where the quintuple can be represented by a source IP address, a destination IP address, a source port, a destination port, a protocol type TCP/UDP); it can also be a category of the service itself, such as voice service, a video service, etc., which is not specifically limited in the embodiment.

As an embodiment, the N outbound-interface-direction queues do not include a reserved queue. In this case, optionally, the N outbound-interface-direction queues satisfy the following requirement: queues in the same outbound interface direction have the same corresponding service attribute. Here, the reserved queue can be a Best Effort queue. The Best Effort queue can send out any number of packets at any time, and does not provide any guarantees for bandwidth, delay, jitter, and reliability.

As another embodiment, the N outbound-interface-direction queues may also include at least one reserved queue. In this case, optionally, queues other than reserved queue among the N outbound-interface-direction queues satisfy the following requirement: queues in the same outbound interface directions have the same corresponding service attribute. The reserved queue may not be restricted by the requirement.

Once the length of one time slice is determined at step 101, as described at step 102, the number M of time slices in the outbound-interface-direction-queue scheduling period corresponding to the outbound interface is determined based on the determined length of one time slice and the designated one-hop delay. In this way, the outbound-interface-direction-queue scheduling period can be determined. As for how to determine the number M of time slices in the outbound-interface-direction-queue scheduling period corresponding to the outbound interface based on the determined length of one time slice and the designated one-hop delay, it will be described with an example later, and will not be elaborated here. In addition, it should be noted that the designated one-hop delay is also the longest one-hop delay acceptable at present, and it can be set based on actual conditions. For example, it can be set to 1 ms, 100 us, and so on. The embodiment of the present disclosure is not specifically limited.

Step 103, based on service attributes corresponding to outbound-interface-direction queues, corresponding time slices in the outbound-interface-direction-queue scheduling period are allocated to the outbound-interface-direction queues, such that the network device, on each time slice in the outbound-interface-direction-queue scheduling period, schedules packets in an outbound-interface-direction queue corresponding to the time slice.

At step 103, corresponding time slices are allocated to respective outbound-interface-direction queues based on the service attributes corresponding to respective outbound-interface-direction queues. As a result, the total number of time slices allocated to the N outbound-interface-direction queues is M time slices, that is, N outbound-interface-direction queues occupy N time slices. It should be noted that, in view of the particularity of reserved queues, if the N outbound-interface-direction queues include at least one reserved queue, in this case, time slices can be first allocated to the N outbound-interface-direction queues except the reserved queue, after that, if there are remaining time slices after the allocation is completed, the remaining time slices can be allocated to the reserved queue, otherwise, no time slice can be allocated to the reserved queue.

Optionally, since the reserved queue can send out any number of packets at any time, whether a time slice is allocated to it or not, the reserved queue can send in a time slice corresponding to an outbound-interface-direction queue to which the time slice has been allocated based on actual situation. For example, for a time slice, there is still time remaining after sending the packets in the corresponding outbound-interface-direction queue. At this time, the packets in the reserved queue can be sent within the remaining time. For another example, for a time slice, there is still time remaining after sending a packet in the corresponding outbound-interface-direction queue. At this time, the remaining time is not enough to send the next packet in the outbound-interface-direction queue, then the packet in the reserved queue can be sent within the remaining time.

Optionally, if N is equal to M, taking the values of N and M as 10 as an example, based on step 103, the time slices allocated to the 10 outbound-interface-direction queues are shown in Table 1.

TABLE 1

| | Outbound-Interface-Direction-Queue | | | | | | | | | |
|---|---|---|---|---|---|---|---|---|---|---|
| | Time Slice 1 | Time Slice 2 | Time Slice 3 | Time Slice 4 | Time Slice 5 | Time Slice 6 | Time Slice 7 | Time Slice 8 | Time Slice 9 | Time Slice 10 |
| Scheduling Period | Queue 1 | Queue 2 | Queue 3 | Queue 4 | Queue 5 | Queue 6 | Queue 7 | Queue 8 | Queue 9 | Queue 10 |

Based on Table 1, when the network device schedules a packet in the outbound-interface-direction-queue scheduling period, the network device schedules, on each time slice in the outbound-interface-direction-queue scheduling period, a packet in an outbound-interface-direction queue corresponding to the time slice. For the scheduling method, the best result is that just after the packet enters the outbound-interface-direction queue, the packet in the outbound-interface-direction queue is sent on the current time slice in the outbound-interface-direction-queue scheduling period. In this case, the delay of waiting for scheduling outbound-interface-direction queues for the packet is the smallest (denoted as the best delay), such as 0 by default. The worst result is that after the packet has just entered the outbound-interface-direction queue, and it just passes the time slice corresponding to the outbound-interface-direction queue, the packet has to wait for the next outbound-interface-direction-queue scheduling period to be sent. The delay of waiting for scheduling outbound-interface-direction queues is the longest (denoted as the worst delay), which is "one outbound-interface-direction-queue scheduling period". If the length of the time slice is 1 ms, and one queue scheduling period T of the outbound interface direction has 10 time slices (that is, one queue scheduling period T of the outbound interface direction is 10 ms), the worst delay is 10 ms. That is to say, the length of the worst delay is determined by the length of the time slice*the number of time slices in one outbound-interface-direction-queue scheduling period. Based on the description, it can be roughly determined that the delay of waiting for scheduling outbound-interface-direction queues is between the worst delay and the best delay. This enables the determination of the delay of waiting for scheduling outbound-interface-direction queues. Based on the description of the possible delay in the packet forwarding process, the embodiment finally realizes deterministic delay.

So far, the process shown in FIG. 1 has been completed.

It can be seen from the process shown in FIG. 1 that in the embodiment of the present disclosure, by setting up a corresponding outbound-interface-direction-queue scheduling period for the outbound interface on the network device, a number of time slices in the outbound-interface-direction-queue scheduling period, and a length of one time slice, and allocating corresponding time slices in the outbound-interface-direction-queue scheduling period to the outbound-interface-direction queues corresponding to the outbound interface, such that the network device can schedule, on each time slice in the outbound-interface-direction-queue scheduling period, packets in the outbound-interface-direction queue corresponding to the time slice. This can realize that the delay of waiting for scheduling outbound-interface-direction queues is maintained between the worst delay and the best delay as discussed above, realize deterministic delay of waiting for scheduling outbound-interface-direction queues, and thus realize deterministic delay of packet forwarding.

The following describes how to determine the length of one time slice corresponding to the outbound interface based on the bandwidth of the outbound interface for forwarding packets on the network device and the designated packet length at step 101.

Optionally, in the embodiment, to decide the length of one time slice, the first thing to consider is the packet length. For any one time slice, the length of the packet transmitted in the time slice is fixed. However, in an IP network, IP packets are variable-length packets, which cannot be a fixed length of packets transmitted in any one time slice. In view of this, in the embodiment of the present disclosure, the packet length can be designated based on actual needs, for example, the designated packet length is 64 bytes, 512 bytes, 1518 bytes, 2 Kbytes.

Figure 2:
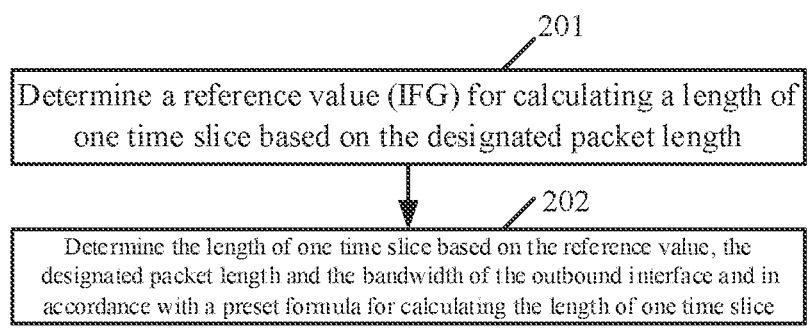
FIG. 2 is a flowchart for implementing step 101 provided by an embodiment of the present disclosure.

Based on the designated packet length set up as above, the determination of the length of one time slice corresponding to the outbound interface based on the bandwidth of the outbound interface used for forwarding packets on the network device and the designated packet length can include the process shown in FIG. 2.

Refer to FIG. 2, which is a flowchart for implementing step 101 provided by an embodiment of the present disclosure. As shown in FIG. 2, the process can include the following steps.

Step 201, a reference value (IFG) for calculating a length of one time slice is determined based on the designated packet length.

Optionally, when the reference value IFG designated that the packet length is an integer multiple of 4 bytes, for example, the designated packet length is 64 bytes, 512 bytes, 1518 bytes, 2K bytes, and so on, then the value can be the first value, such as 12, otherwise, the value can be the second value, such as other values than 12.

Step 202, the length of one time slice is determined based on the reference value, the designated packet length and the bandwidth of the outbound interface and in accordance with a preset equation for calculating the length of one time slice.

Optionally, the preset equation for calculating the length of one time slice can be the following Equation 1:

$$i \cdot (8+\text{Frame}+\text{IFG})*8/\text{Bandwidth};  \quad \text{(Equation 1)}$$

where Frame is the designated packet length. IFG is as described above, which will not be elaborated here, and Bandwidth is the bandwidth of the outbound interface.

Taking the outbound interface bandwidth of 10G Ethernet as an example, Table 2 shows the lengths of one time slice for different designated packet lengths.

TABLE 2

| FPS (frames per second) | Packet Length | Length of Time Slice (us) |
|---|---|---|
| 14880952 | ·64 Bytes | 0.0672 |
| 2349624 | ·512 Bytes | 0.4256 |
| 812744 | ·1518 Bytes | 1.2304 |
| 604449 | ·2K Bytes | 1.6544 |

Next, taking the outbound interface bandwidth of 100G Ethernet as an example, Table 3 shows the lengths of one time slice for different designated packet lengths.

TABLE 3

| FPS (frames per second) | Packet Length | Length of Time Slice (us) |
|---|---|---|
| 148809523.8 | ·64 Bytes | 0.00672 |
| 23496240.6 | ·512 Bytes | 0.04256 |
| 8127438.231 | ·1518 Bytes | 0.12304 |
| 6044487.427 | ·2K Bytes | 0.16544 |

So far, the process shown in FIG. 2 has been completed.

Through the process shown in FIG. 2, it can realize how to determine the length of one time slice corresponding to the outbound interface based on the bandwidth of the outbound interface for forwarding packets on the network device and the designated packet length. It should be noted that the process shown in FIG. 2 is only an example, and is not used for limitation.

Figure 3:
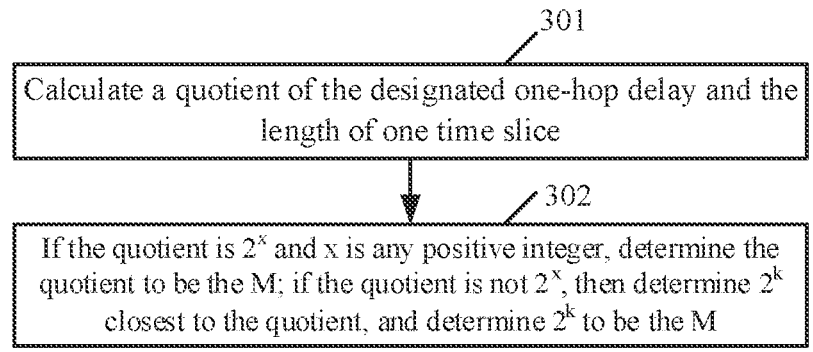
FIG. 3 is a flowchart for implementing step 102 provided by an embodiment of the present disclosure.

The following describes how step 102 determines the number M of time slices in the outbound-interface-direction-queue scheduling period corresponding to the outbound interface based on the length of one time slice and the designated one-hop delay through the process shown in FIG. 3.

Refer to FIG. 3, which is a flowchart for implementing step 102 provided by an embodiment of the present disclosure. As shown in FIG. 3, the process can include the following steps.

Step 301, a quotient of the designated one-hop delay and the length of one time slice is calculated.

Optionally, step 301 can be expressed by the following Equation 2: a designated one-hop delay/the length of one time slice.

For example, if the designated one-hop delay is 1 ms and the length of one time slice is 0.4256 us, the quotient obtained at step 301 is 1000 us/0.4256 us=2349. For another example, if the designated one-hop delay is 1 ms and the length of one time slice is 0.04256 us, the quotient obtained at step 301 is 1000 us/0.04256 us=23496.

In order to be applied to a digital circuit, optionally, the number of time slices in the outbound-interface-direction-queue scheduling period is M, which generally has to be equal to $2^x$, where x can be any positive integer. Based on this, the embodiment can determine the number M of time slices in the outbound-interface-direction-queue scheduling period with the quotient obtained at step 301 and $2^x$ together. For details, reference can be made to the description of step 302 below.

Step 302, if the quotient is $2^x$ and x is any positive integer, the quotient is determined to be the M; if the quotient is not $2^x$, then $2^k$ closest to the quotient is determined, and $2^k$ is determined to be the M.

For example, if the quotient obtained is 2349, 2048 ($2^{11}$), which is closest to 2349, can be selected as the M. For another example, if the quotient obtained is 23496, 16384 ($2^{14}$) which is closest to 23496 can be selected as the M.

So far, the process shown in FIG. 3 has been completed.

Through the process shown in FIG. 3, the number M of time slices in the outbound-interface-direction-queue scheduling period is finally determined. Correspondingly, the duration of each outbound-interface-direction-queue scheduling period is the length of the M time slices.

Next, through the process shown in FIG. 4, description will be made as how to allocate corresponding time slices in the outbound-interface-direction-queue scheduling period to outbound-interface-direction queues based on service attributes corresponding to the outbound-interface-direction queues at step 103.

Figure 4:
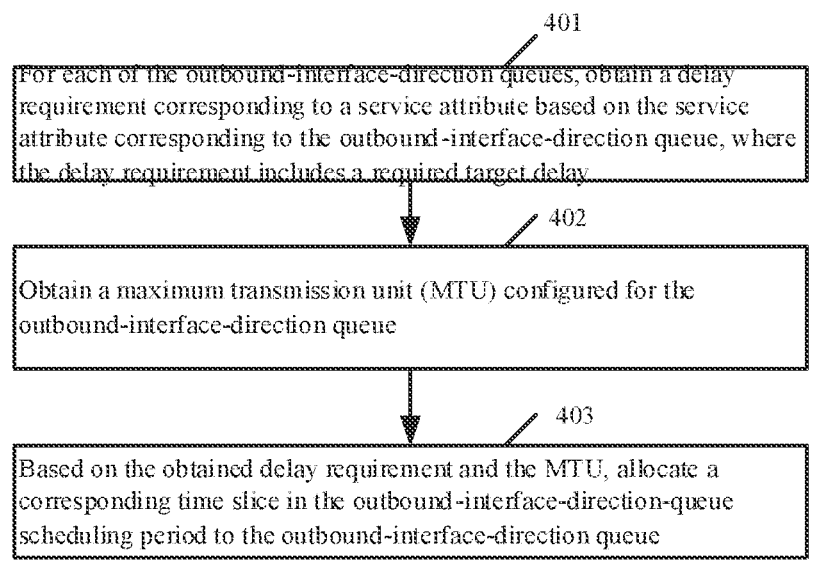
FIG. 4 is a flowchart for implementing step 103 provided by an embodiment of the present disclosure.

Refer to FIG. 4, which is a flowchart for implementing step 103 provided by an embodiment of the present disclosure. As shown in FIG. 4, the process can include the following steps.

Step 401, for each of the outbound-interface-direction queues, a delay requirement corresponding to a service attribute is obtained based on the service attribute corresponding to the outbound-interface-direction queue, and the delay requirement includes a required target delay.

In the application, an outbound-interface-direction queue corresponds to one type of service (corresponding to a service attribute), and for the corresponding type of service the corresponding delay requirement will be configured based on the characteristics of the service. When the service has a high requirement on the delay, the target delay in the corresponding delay requirement is relatively small. On the contrary, when the service has a low requirement on the delay, the target delay in the corresponding delay requirement is relatively large.

Step 402, a maximum transmission unit (MTU) configured for the outbound-interface-direction queue is obtained.

As described above, an outbound-interface-direction queue corresponds to one type of service (corresponding to a service attribute). For this type of service, the MTU will be configured based on the actual requirement of the service per se, to prevent traffic jams.

Step 403, based on the obtained delay requirement and the MTU, a corresponding time slice in the outbound-interface-direction-queue scheduling period is allocated to the outbound-interface-direction queue.

Optionally, when step 403 is specifically implemented, it can be implemented based on a delay in accordance with both policies of avoiding packet splitting and satisfying service requirement. For example, for the outbound-interface-direction queue, if the MTU configured for the outbound-interface-direction queue is larger than the designated packet length, a plurality of consecutive time slices in one outbound-interface-direction-queue scheduling period can be allocated to the outbound-interface-direction queue to satisfy the service demand for a larger maximum packet length and avoid splitting and reorganization of a packet. For another example, for the outbound-interface-direction queue, if the delay requirement configured for the outbound-interface-direction queue is relatively high, for example, the required target delay is very small, then a plurality of scattered time slices in one outbound-interface-direction-queue scheduling period can be allocated to the outbound-interface-direction queue, in order to achieve higher and more uniform delay.

Based on this, step 403 can include the following scenarios in specific implementation.

Scenario 1. When the outbound-interface-direction queue has a relatively high delay requirement (represented by the target delay required by the outbound-interface-direction queue being smaller than or equal to a preset day threshold), and the MTU configured for the outbound-interface-direction queue is shorter than or equal to the designated packet length, time slices separated by the target delay in one outbound-interface-direction-queue scheduling period can be allocated to the outbound-interface-direction queue. For example, the queue 1 shown in Table 4 has a relatively high delay requirement, and the required target delay is smaller than or equal to the preset delay threshold. As shown in Table 4, Time Slice 1, Time Slice 7, Time Slice 16 and so on in one outbound-interface-direction-queue scheduling period can be allocated to Queue 1 to satisfy the delay required by Queue 1.

TABLE 4

| | \multicolumn{9}{c}{Outbound-Interface-Direction-Queue} |
|---|---|---|---|---|---|---|---|---|---|
| | Time Slice 1 | Time Slice 2 | Time Slice 3 | Time Slice 4 | Time Slice 5 | Time Slice 6 | Time Slice 7 | Time Slice 8 | ... Time Slice M |
| Scheduling Period | Queue 1 | Queue 2 | Queue 3 | Queue 4 | Queue 5 | Queue 6 | Queue 1 | Queue 7 | ... Queue N |

Scenario 2. When the outbound-interface-direction queue has a relatively high delay requirement (represented by the target delay required by the outbound-interface-direction queue being smaller than or equal to a preset day threshold), and the MTU configured for the outbound-interface-direction queue is longer than the designated packet length, time slice groups separated by the target delay in one outbound-interface-direction-queue scheduling period can be allocated to the outbound-interface-direction queue. Here, the time slice group includes L adjacent time slices, and L is the number of time slices occupied by the MTU configured for the outbound-interface-direction queue. For example, the queue 1 shown in Table 5 has a relatively high delay requirement, and the required target delay is smaller than or equal to the preset delay threshold, but the MTU configured for the queue 1 is longer than the designated packet length, such as four times of the designated packet length. As shown in Table 5, a time slice group (including consecutive 4 time slices) separated by the target delay in one outbound-interface-direction-queue scheduling period can be allocated to Queue 1, to satisfy the delay required by Queue 1 without splitting the packet in Queue 1.

Scenario 4. When the outbound-interface-direction queue has not a very high delay requirement (represented by the target delay required by the outbound-interface-direction queue being larger than a preset day threshold), and the MTU configured for the outbound-interface-direction queue is longer than the designated packet length, a number P2 of time slice groups in one outbound-interface-direction-queue scheduling period can be allocated to the outbound-interface-direction queue. Here, the time slice group includes L adjacent time slices, and L is the number of time slices occupied by the MTU configured for the outbound-interface-direction queue. Generally, P2 equals to 1, and in other cases, if P2 is greater than 1, the P2 time slice groups are scattered in one scheduling period of the queues in the same outbound interface direction. For example, P2 equals to 1, such as in Table 6, Queue 1 does not have a high requirement

TABLE 5

| | \multicolumn{8}{c}{Outbound-Interface-Direction-Queue} |
|---|---|---|---|---|---|---|---|---|
| | Time Slice 1 | Time Slice 2 | Time Slice 3 | Time Slice 4 | Time Slice 5 | ... Time Slice 10 | Time Slice 11 | ... Time Slice M |
| Scheduling Period | Queue 1 | Queue 1 | Queue 1 | Queue 1 | Queue 2 | ... Queue 1 | Queue 1 | ... Queue N |

Scenario 3. When the outbound-interface-direction queue has not a very high delay requirement (represented by the target delay required by the outbound-interface-direction queue being larger than a preset day threshold), and the MTU configured for the outbound-interface-direction queue is shorter than the designated packet length, a number P1 of time slices in one outbound-interface-direction-queue scheduling period can be allocated to the outbound-interface-direction queue, where P1 is larger than or equal to 1, generally equal to 1, and in other cases, if P1 is greater than 1, the P1 time slices are scattered in one scheduling period of the queues in the same outbound interface direction. For example, P1 equals to 1, the above Table 1 illustrates the corresponding time slices allocated to the outbound-interface-direction queues in one scheduling period of queues in the same outbound interface direction.

on delay, and the target delay required is larger than a preset delay threshold, but the MTU configured for Queue 1 is longer than the designated packet length, such as 4 times of the designated packet length. As shown in Table 6, one time slice group (including consecutive 4 time slices) in one outbound-interface-direction-queue scheduling period can be allocated to Queue 1, in order not to split the packet in Queue 1.

TABLE 6

| | \multicolumn{9}{c}{Outbound-Interface-Direction-Queue} |
|---|---|---|---|---|---|---|---|---|---|
| | Time Slice 1 | Time Slice 2 | Time Slice 3 | Time Slice 4 | Time Slice 5 | Time Slice 6 | Time Slice 7 | Time Slice 8 | ... Time Slice M |
| Scheduling Period | Queue 1 | Queue 1 | Queue 1 | Queue 1 | Queue 2 | Queue 3 | Queue 4 | Queue 5 | ... Queue N |

The above have described how to allocate the corresponding time slice in the outbound-interface-direction-queue scheduling period to the outbound-interface-direction queue based on the obtained delay requirement and the MTU at step 103. It should be noted that the four scenarios are only examples and not limiting.

As described above, after corresponding time slices are allocated to the outbound-interface-direction queues corresponding to the outbound interface, in one outbound-interface-direction-queue scheduling period corresponding to the outbound interface in the network device, subsequently, the network device can schedule the outbound-interface-direction queues based on the time slices. As shown in Table 6, in one outbound-interface-direction-queue scheduling period, the network device can schedule Queue 1 on four time slices of Time Slice 1, Time Slice 2, Time Slice 3, and Time Slice 4, schedule Queue 2 on Time Slice 5, and so on. It should be noted that when scheduling any queue, if the remaining time in the time slice corresponding to the queue is not enough to send the next packet in the queue, a packet in the configured reserved queue can be sent within the remaining time.

Based on the description of the process shown in FIG. 1 to FIG. 4, it is possible to estimate the delay from the network device receiving the packet to sending the packet (also referred to as one-hop delay). The end-to-end delay can be obtained by adding up the delay of each hop of each network device on the forwarding path. The forwarding path can be referred to as a path that guarantees end-to-end delay.

It should also be noted that, in the embodiment, optionally, the management device can determine a corresponding forwarding path for a packet before the network device forwards the packet sent from a terminal to which the network device has accessed. Optionally, here, the network device can send a path request to the management device when receiving a packet sent by the terminal to which the network device has accessed, so as to indicate that the network device has received a packet sent by the terminal to which the network device has accessed, to request the management device to determine a corresponding forward path for the packet received by the network device. In this way, the management device can determine the corresponding forwarding path for the packet based on the configured path scheduling algorithm. Here, the specific manner of determining the forwarding path is not specifically limited in the embodiment.

After determining the forwarding path corresponding to the packet, optionally, The management device can also notify the network device of the target outbound interface, the identifier of the target outbound-interface-direction queue (also corresponding to the service attribute matching with the packet) corresponding to the target outbound interface, and the identifier of the target time slice corresponding to the target outbound-interface-direction queue on each hop of the forwarding path. As an embodiment, after the network device receives the target outbound interface, the identifier of the target outbound-interface-direction queue corresponding to the target outbound interface, and the identifier of the target time slice corresponding to the target outbound-interface-direction queue on each hop of the forwarding path from the management device, the network device appends the target outbound interface, the identifier of the target outbound-interface-direction queue, and the identifier of the target time slice on each hop of the forwarding path to the Segment Route (SR) header encapsulated for the packet. Table 7 shows an example of the information appended to the SR header:

TABLE 7

| 1 | Next Hop IP 1 | Target Outbound Interface 1 | Identifier of Target Outbound-Interface-Direction Queue 1 | Identifier of Target Time Slice 1 |
|---|---|---|---|---|
| 2 | Next Hop IP 2 | Target Outbound Interface 2 | Identifier of Target Outbound-Interface-Direction Queue 2 | Identifier of Target Time Slice 2 |
| 3 | Next Hop IP 3 | Target Outbound Interface 3 | Identifier of Target Outbound-Interface-Direction Queue 3 | Identifier of Target Time Slice 3 |
| 4 | Next Hop IP 4 | Target Outbound Interface 4 | Identifier of Target Outbound-Interface-Direction Queue 4 | Identifier of Target Time Slice 4 |
| 5 | Next Hop IP 5 | Target Outbound Interface 5 | Identifier of Target Outbound-Interface-Direction Queue 5 | Identifier of Target Time Slice 5 |
| 6 | Next Hop IP 6 | Target Outbound Interface 6 | Identifier of Target Outbound-Interface-Direction Queue 6 | Identifier of Target Time Slice 6 |
| 7 | Next Hop IP 7 | Target Outbound Interface 7 | Identifier of Target Outbound-Interface-Direction Queue 7 | Identifier of Target Time Slice 7 |
| 8 | Next Hop IP 8 | Target Outbound Interface 8 | Identifier of Target Outbound-Interface-Direction Queue 8 | Identifier of Target Time Slice 8 |

Optionally, the reason why the network device appends the target outbound interface, the identifier of the target outbound-interface-direction queue corresponding to the target outbound interface, and the identifier of the target time slice corresponding to the target outbound-interface-direction queue on each hop of the forwarding path to the SR header of the packet lies is to instruct a further network device on the forwarding path that receive the packet to directly refer to the target outbound interface, the identifier of the target outbound-interface-direction queue and the identifier of the target time slice appended in the SR header to forward the packet without re-checking the forwarding table, thereby to guarantee the delay. Optionally, if the forwarding path changes during the packet forwarding process, for the packet being forwarded along the forwarding path at this time, since the information in the SR header encapsulated for the packet cannot be modified, the packet can be forwarded directly by conventional routing.

In the embodiment, the size of each outbound-interface-direction queue is limited. Here, the size of the outbound-interface-direction queue can be characterized by a number of buffers used to store packets in the outbound-interface-direction queue. One buffer stores a packet. If the outbound-interface-direction queue can support Z buffers at maximum, it means that the outbound-interface-direction queue can hold Z packets at maximum. As an embodiment, the number of buffers in one outbound-interface-direction queue can be preset based on actual requirements, for example, based on acceptable packet buffering time and acceptable transmission delay. The following Equation 3 illustrates the number of buffers in one outbound-interface-direction queue:

$$a. \text{ Number of buffers} = B1 + 2 * \text{Number } B2 \text{ of packets transmitted by RTT} \quad \text{(Equation 3)}$$

where B1 represents the number of packets corresponding to the acceptable packet buffering time. Here, the acceptable packet buffering time can be determined based on the allowable waiting time of the service. RTT represents the acceptable transmission delay, which can be determined based on the transmission distance and outbound interface bandwidth. For example, for time-sensitive services, RTT can be determined as the maximum one-hop delay (that is, one outbound-interface-direction-queue scheduling period)*N, where N is the number of outbound-interface-direction queues.

Optionally, in the embodiment, for any device on the forwarding path, when the device receives a packet, the device obtains the local outbound interface and the identifier of the target outbound-interface-direction queue corresponding to the local outbound interface of said device from the SR header encapsulated for the packet. if it is found that the number of packets currently stored in the outbound-interface-direction queue corresponding to the obtained queue identifier is larger than or equal to a preset packet number threshold, it is determined that the queue is congested. At this time, a congestion notification can be sent to the management device. Here, the preset packet number threshold can be set based on actual needs, for example, based on the following Equation 4:

$$\text{Preset packet number threshold} = (B3 - 2 * \text{Number} \\ \text{of packets transmitted by RTT}) * C \% \quad \text{(Equation 4)}$$

where $B3$ represents the maximum number of packets allowed in the queue, $B2$ is as described above, and $C$ is set based on actual experience, and its value is a positive integer ranging from 0 to 100.

When the management device receives and records the congestion notification, subsequently, when determining other packets to have the same service attribute corresponding to the above mentioned packet, the management device will not determine the above forwarding path for forwarding the packet. It should be noted that if it is later found that the number of packets currently stored in the outbound-interface-direction queue has changed from larger than or equal to the preset packet number threshold to smaller than the preset packet number threshold, it means that the outbound-interface-direction queue is no longer congested, a congestion cancellation notice can also be sent to the management device at this time. When the management device receives the congestion cancellation notice and then determines other packets with the same service attribute corresponding to the above mentioned packet, the management device can also determine the above forwarding path to continue forwarding the packet.

The above has described the embodiments of the present disclosure from the perspective of the management device. In the following embodiments of the present disclosure will be described from the perspective of the network device managed by the management device.

Figure 5:
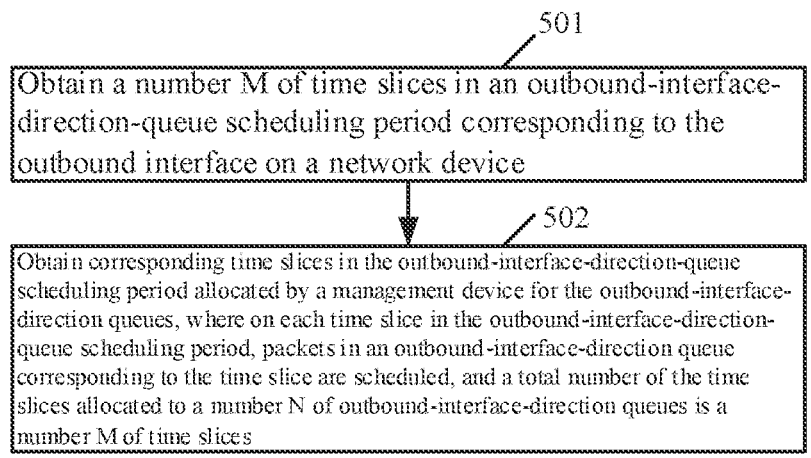
FIG. 5 is a flowchart of another method provided by an embodiment of the present disclosure.

Refer to FIG. 5, which is a flowchart of another method provided by an embodiment of the present disclosure. This process is applied to a network device, such as a SDN switch and others, which is not specifically limited in the embodiment.

As shown in FIG. 5, the process can include the following steps.

Step 501, a number M of time slices in an outbound-interface-direction-queue scheduling period corresponding to the outbound interface on said network device is obtained.

Optionally, M is determined based on the length of one time slice corresponding to the outbound interface and a designated one-hop delay, and reference can be made to the process shown in FIG. 3. As an embodiment, the length of one time slice is determined based on the bandwidth of the outbound interface and the designated packet length. For details, reference can be made to the process shown in FIG. 2, which will not be elaborated here.

In the embodiment, the outbound-interface-direction-queue scheduling period is used to schedule N outbound-interface-direction queues corresponding to the outbound interface; different outbound interface directions correspond to different service attributes; and N is greater than or equal to 1.

Step 502, corresponding time slices in the outbound-interface-direction-queue scheduling period allocated by a management device for the outbound-interface-direction queues are obtained, where on each time slice in the outbound-interface-direction-queue scheduling period, packets in an outbound-interface-direction queue corresponding to the time slice are scheduled, and a total number of the time slices allocated to a number N of outbound-interface-direction queues is a number M of time slices.

Optionally, in the embodiment, for each outbound-interface-direction queue corresponding to the outbound interface, the management device can allocate a corresponding time slice to the outbound-interface-direction queue in the outbound-interface-direction-queue scheduling period corresponding to the outbound interface. For the specific allocation method, reference can be made to the process shown in FIG. 4, details of which will not be elaborated here. After the network device obtains the corresponding time slice in the outbound-interface-direction-queue scheduling period allocated by the management device for the outbound-interface-direction queue, as described at step 502, the network device schedules, on each time slice in the outbound-interface-direction-queue scheduling period, packets in the outbound-interface-direction queue corresponding to the time slice. Based on the description, based on the process shown in FIG. 5, it is finally possible to roughly determine that the delay of waiting for scheduling outbound-interface-direction queues is between the worst delay and the best delay. This can realize deterministic delay of waiting for scheduling outbound-interface-direction queues. Based on the above description of the possible delay in the packet forwarding process, the embodiment finally can realize deterministic delay.

So far, the process shown in FIG. 5 has been completed.

It can be seen from the process shown in FIG. 5 that, in the embodiment of the present disclosure, the network device, on each time slice in the outbound-interface-direction-queue scheduling period, schedules packets in the outbound-interface-direction queue corresponding to the time slice. This can realize that the delay of waiting for scheduling outbound-interface-direction queues is between the worst delay and the best delay as discussed above, and the delay of waiting for scheduling outbound-interface-direction queues can be deterministic, thereby realizing deterministic delay of packet forwarding.

In the embodiment, when the network device receives a packet sent by a local terminal, the network device can perform the process shown in FIG. 6 below.

Figure 6:
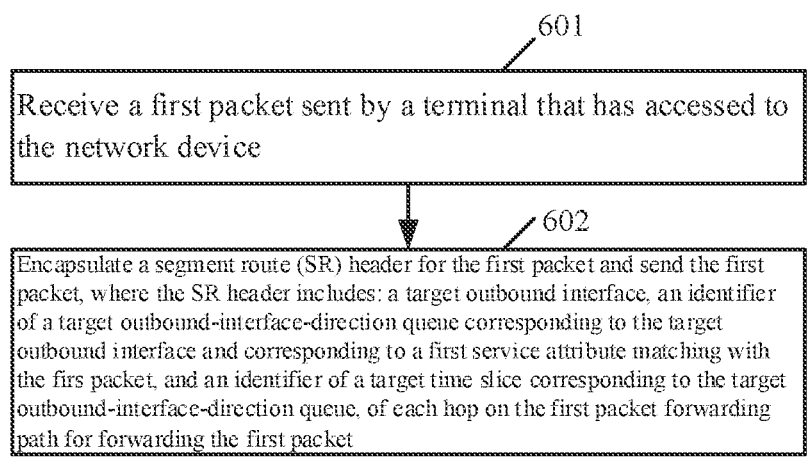
FIG. 6 is a flowchart of packet forwarding provided by an embodiment of the present disclosure.

Refer to FIG. 6, which is a flowchart of packet forwarding provided by an embodiment of the present disclosure. As shown in FIG. 6, the process can include the following steps.

Step 601, a first packet sent by a terminal that has accessed to the network device is received.

Here, the first packet is only named for the convenience of description, not for limitation.

Step 602, a segment route (SR) header is encapsulated for the first packet and the first packet is sent, where the SR header includes: a target outbound interface, an identifier of a target outbound-interface-direction queue corresponding to the target outbound interface and corresponding to a first service attribute matching with the first packet, and an identifier of a target time slice corresponding to the target outbound-interface-direction queue, of each hop on the first packet forwarding path for forwarding the first packet.

Optionally, if the network device does not currently have a first forwarding path for forwarding the first packet (the first forwarding path is only named for the convenience of description, not for limitation), the network device can request the management device for a first forwarding path. Similarly, if the network device does not currently have a target outbound interface, an identifier of a target outbound-interface-direction queue corresponding to the target outbound interface and corresponding to a first service attribute matching with the first packet, and an identifier of a target time slice corresponding to the target outbound-interface-direction queue, of each hop on the first packet forwarding path for forwarding the first packet, the network device can request the management device for those.

In the embodiment, the reason why the network device includes the target outbound interface, the identifier of a target outbound-interface-direction queue, and the identifier of the target time slice corresponding to the target outbound-interface-direction queue of each hop on the first packet forwarding path in the SR header is to instruct a further network device on the first forwarding path that receive the first packet to directly refer to the target outbound interface, the identifier of the target outbound-interface-direction queue and the identifier of the target time slice in the SR header to forward the first packet instead of forwarding by routing.

So far, the process shown in FIG. 6 has been completed.

It can be seen from the process shown in FIG. 6 that in the embodiment, through the modification of SR, the SR header is no longer limited to the next hop, but the extended SR header not only indicates the next hop on the forwarding path, it is also appended with the outbound interface, the identifier of the outbound-interface-direction queue corresponding to the service attribute matching with the packet, and the identifier of the time slice corresponding to the outbound-interface-direction queue on each hop, which can ensure that forwarding on each hop on the forwarding path is performed based on the SR header, to guarantee the delay.

In the embodiment, the network device will also receive a remote packet (denoted as a second packet) forwarded by a further network device. When a second packet is received, the process shown in FIG. 7 below can be performed.

Figure 7:
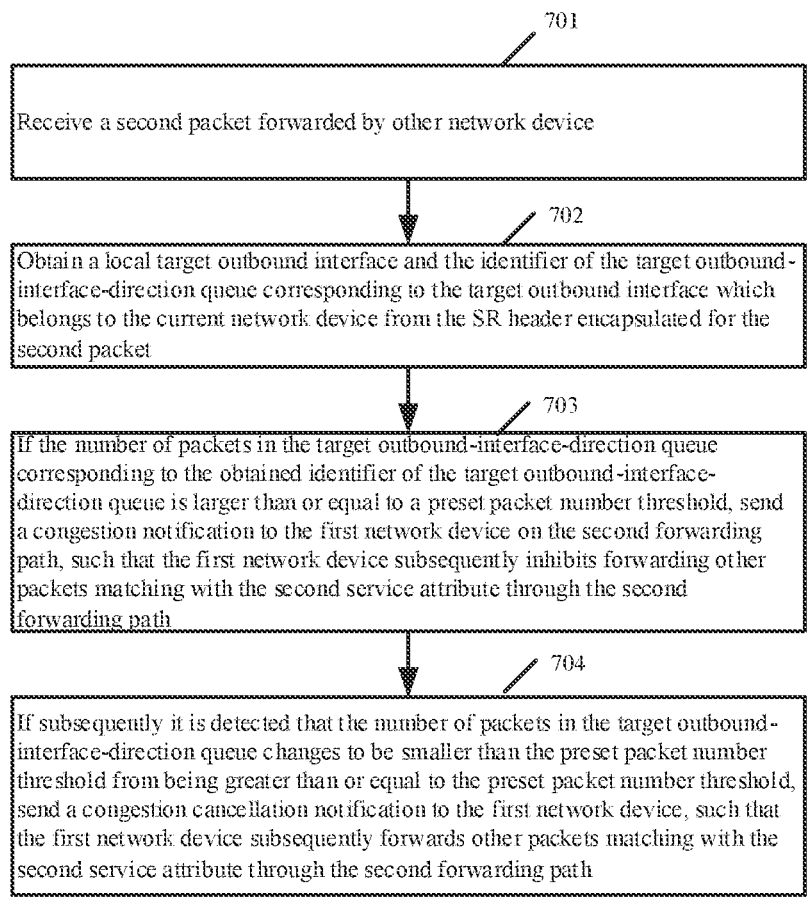
FIG. 7 is another flowchart of packet forwarding provided by an embodiment of the present disclosure.

Refer to FIG. 7, which is another flowchart of packet forwarding provided by an embodiment of the present disclosure. As shown in FIG. 7, the process can include the following steps.

Step 701, a second packet forwarded by a further network device is received.

Here, the SR header encapsulated for the second packet can include: a target outbound interface, an identifier of a target outbound-interface-direction queue corresponding to the target outbound interface and corresponding to a second service attribute matching with the second packet, and a time slice identifier of a target time slice corresponding to the target outbound-interface-direction queue, of each hop on a path for forwarding the second packet (denoted as a second packet forwarding path).

Step 702, a local target outbound interface and the identifier of the target outbound-interface-direction queue corresponding to the target outbound interface which belongs to the present network device are obtained from the SR header encapsulated for the second packet.

Step 703, if the number of packets in the target outbound-interface-direction queue corresponding to the obtained identifier of the target outbound-interface-direction queue is larger than or equal to a preset packet number threshold, a congestion notification is sent to the first network device on the second forwarding path, such that the first network device subsequently inhibits forwarding other packets matching with the second service attribute through the second forwarding path.

Optionally, as an embodiment, if the number of packets in the target outbound-interface-direction queue corresponding to the obtained identifier of the target outbound-interface-direction queue is larger than or equal to a preset packet number threshold, in order to avoid service interruption, the packet can be further stored in the target-outbound-interface-direction queue.

If the SR header encapsulated for the second packet contains the following information as shown in Table 8 as an example.

TABLE 8

| 1 | Next Hop IP 1 | Target Outbound Interface 1 | Identifier of Target Outbound-Interface-Direction Queue 1 | Identifier of Target Time Slice 1 |
| 2 | Next Hop IP 2 | Target Outbound Interface 2 | Identifier of Target Outbound-Interface-Direction Queue 2 | Identifier of Target Time Slice 2 |
| 3 | Next Hop IP 3 | Target Outbound Interface 3 | Identifier of Target Outbound-Interface-Direction Queue 3 | Identifier of Target Time Slice 3 |
| 4 | Next Hop IP 4 | Target Outbound Interface 4 | Identifier of Target Outbound-Interface-Direction Queue 4 | Identifier of Target Time Slice 4 |
| 5 | Next Hop IP 5 | Target Outbound Interface 5 | Identifier of Target Outbound-Interface-Direction Queue 5 | Identifier of Target Time Slice 5 |
| 6 | Next Hop IP 6 | Target Outbound Interface 6 | Identifier of Target Outbound-Interface-Direction Queue 6 | Identifier of Target Time Slice 6 |
| 7 | Next Hop IP 7 | Target Outbound Interface 7 | Identifier of Target Outbound-Interface-Direction Queue 7 | Identifier of Target Time Slice 7 |
| 8 | Next Hop IP 8 | Target Outbound Interface 8 | Identifier of Target Outbound-Interface-Direction Queue 8 | Identifier of Target Time Slice 8 |

Based on Table 8, if the local target outbound interface obtained by the network device is the outbound interface 5 shown in Table 8, the identifier of the target outbound-interface-direction queue is Queue 5. If the network device finds that the current number of packets in Queue 5 is larger than or equal to the preset packet number threshold, the network device will send a congestion notification to the first network device on the second forwarding path such that the first network device subsequently inhibits forwarding other packets matching with the second service attribute through the second forwarding path. Optionally, the network device sending the congestion notification to the first network device on the second forwarding path can include: based on each next hop in the SR header, sending the congestion notification to the next hop in turn, and finally sending the congestion notification to first network device on the second forwarding path. Optionally, as another embodiment, the network device sending the congestion notification to the first network device on the second forwarding path can include: directly sending the congestion notification to the management device, such that the management device forwards the congestion notification to the first network device on the second forwarding path. It can also implement sending the congestion notification to the first network device on the second forwarding path.

Step 704: if subsequently it is detected that the number of packets in the target outbound-interface-direction queue changes to be smaller than the preset packet number threshold from being greater than or equal to the preset packet number threshold, a congestion cancellation notification is sent to the first network device, such that the first network device subsequently forwards other packets matching with the second service attribute through the second forwarding path.

Optionally, in step 704, if subsequently it is detected that the number of packets in the target outbound-interface-direction queue is smaller than the preset packet number threshold from being greater than or equal to the preset packet number threshold, and the condition of the number of packets in the target outbound-interface-direction queue being smaller than the preset packet number threshold has been maintained for a preset time period, a congestion cancellation notification can be sent to the first network device, such that the first network device subsequently forwards other packets matching with the second service attribute through the second forwarding path.

So far, the process shown in FIG. 7 has been completed.

Through the process shown in FIG. 7, the precise control of congestion can be finally realized, so as to realize the when the queue corresponding to the outgoing interface is congested, it only blocks the original forwarding path of the type of service attribute corresponding to the queue, and does not affect the forwarding of other services, which can guarantee the delay.

The method provided in the embodiments of the present disclosure has been described, and the apparatus provided in the embodiments of the present disclosure will be described below.

Figure 8:
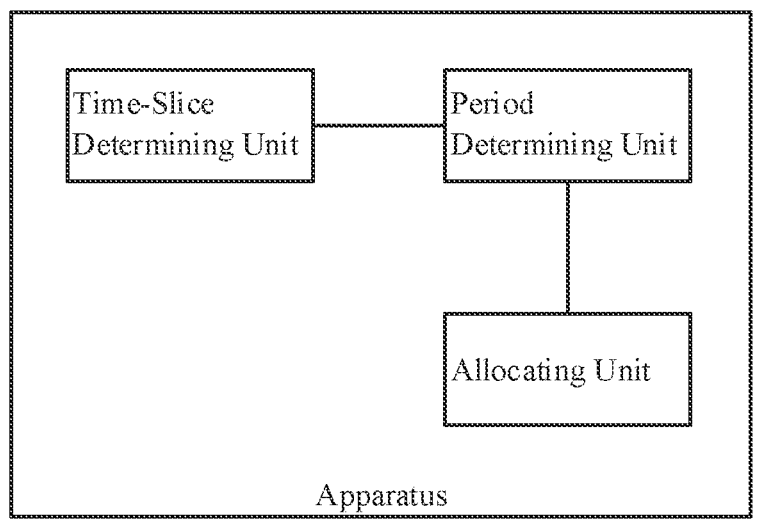
FIG. 8 is a block diagram of an apparatus provided by an embodiment of the present disclosure.

Refer to FIG. 8, which is a block diagram of an apparatus provided by an embodiment of the present disclosure. The apparatus is applied to a management device. The management device is configured to manage at least one network device, and the apparatus can include:
- a time-slice determining unit configured to determine a length of one time slice corresponding to an outbound interface based on a bandwidth of the outbound interface on the network device which is used to forward a packet and a designated packet length;
- a period determining unit configured to determine a number M of time slices in an outbound-interface-direction-queue scheduling period corresponding to the outbound interface based on the length of one time slice and a designated one-hop delay, where M is greater than or equal to 1; the outbound-interface-direction-queue scheduling period is used to schedule N outbound-interface-direction queues corresponding to the outbound interface; different outbound-interface-direction queues correspond to different service attributes; N is greater than or equal to 1;
- an allocating unit configured to, based on service attributes corresponding to outbound-interface-direction queues, allocate corresponding time slices in the outbound-interface-direction-queue scheduling period to the outbound-interface-direction queues, such that the network device, on each time slice in the outbound-interface-direction-queue scheduling period, schedules packets in an outbound-interface-direction queue corresponding to the time slice; where a total number of time slices allocated to the N outbound-interface-direction queues is M time slices.

Optionally, the time-slice determining unit determining a length of one time slice corresponding to an outbound interface based on a bandwidth of the outbound interface on the network device which is used to forward a packet and a designated packet length includes: determining a reference value for calculating a length of one time slice based on the designated packet length; and determining the length of one time slice based on the reference value, the designated packet length and the bandwidth of the outbound interface and determining the length of one time slice in accordance with a preset Equation for calculating the length of one time slice.

Optionally, the preset Equation for calculating the length of one time slice is:

$$(8+\text{Frame}+\text{IFG})*8/\text{Bandwidth};$$

where Frame is the designated packet length, IFG is the reference value, when the packet length is an integer multiple of 4 bytes, IFG can be a first value, otherwise, IFG can be a second value and Bandwidth is the bandwidth of the outbound interface.

Optionally, in the embodiment, the designated packet length is 64 bytes, 512 bytes, 2K bytes, or 1518 bytes.

Optionally, the period determining unit determining a number M of time slices in an outbound-interface-direction-queue scheduling period corresponding to the outbound interface based on the length of one time slice and a designated one-hop delay includes: calculating a quotient of the designated one-hop delay and the length of one time slice; if the quotient is $2^x$ and x is any positive integer, determining the quotient to be the M; if the quotient is not $2^x$, then determining $2^k$ closest to the quotient, and determining $2^k$ to be the M.

Optionally, the allocating unit allocating, based on service attributes corresponding to outbound-interface-direction queues, corresponding time slices in the outbound-interface-direction-queue scheduling period includes: for each of the outbound-interface-direction queues, obtaining a delay requirement corresponding to a service attribute based on the service attribute corresponding to the outbound-interface-direction queue, where the delay requirement includes a required target delay; obtaining a maximum transmission unit (MTU) configured for the outbound-interface-direction queue; based on the obtained delay requirement and the MTU, allocating a corresponding time slice in the outbound-interface-direction-queue scheduling period to the outbound-interface-direction queue.

Optionally, the allocating unit allocating corresponding time slices in the outbound-interface-direction-queue scheduling period to outbound-interface-direction queues includes: when the target delay is smaller than or equal to a preset delay threshold, if the MTU configured for the outbound-interface-direction queue is shorter than or equal to the designated packet length, allocating time slices separated by the target delay in one outbound-interface-direction-queue scheduling period to the outbound-interface-direction queue; and if the MTU configured for the outbound-interface-direction queue is longer than the designated packet length, allocating time slice groups separated by the target delay in one outbound-interface-direction-queue scheduling period to the outbound-interface-direction queue, where the time slice group includes L adjacent time slices, and L is the number of time slices occupied by the MTU configured for the outbound-interface-direction queue; and when the target delay is larger than a preset delay threshold, if the MTU configured for the outbound-interface-direction queue is shorter than or equal to the designated packet length, allocating a number P1 of time slices in one outbound-interface-direction-queue scheduling period to the outbound-interface-direction queue; and if the MTU configured for the outbound-interface-direction queue is longer than the designated packet length, allocating a number P2 of time slice groups in one outbound-interfacedirection-queue scheduling period to the outbound-interface-direction queue, where P1 is larger than or equal to 1, and if P1 is greater than 1, the P1 time slices are scattered; P2 is larger than or equal to 1, and if P2 is greater than 1, the P2 time slice groups are scattered; one time slice group includes L adjacent time slices, and L is the number of time slices occupied by the MTU.

Optionally, before the network device forwards the packet sent by the terminal to which the network device has accessed, the method further includes: determining a forwarding path for forwarding the packet; notifying the network device of a target outbound interface, an identifier of the target outbound-interface-direction queue corresponding to the target outbound interface and corresponding to a service attribute matching with the packet, and an identifier of a target time slice corresponding to the target outbound-interface-direction queue on each hop of the forwarding path, for the network device to append the target outbound interface, the identifier of the target outbound-interface-direction queue corresponding to the target outbound interface and corresponding to the service attribute matching with the packet, and the identifier of the target time slice corresponding to the target outbound-interface-direction queue on each hop of the forwarding path to a segment route SR header, to instruct a further network device on the forwarding path that receive the packet to directly refer to the target outbound interface, the identifier of the target outbound-interface-direction queue and the identifier of the target time slice appended in the SR header to forward the packet.

So far, the structure of the apparatus shown in FIG. 8 has been completed.

Figure 9:
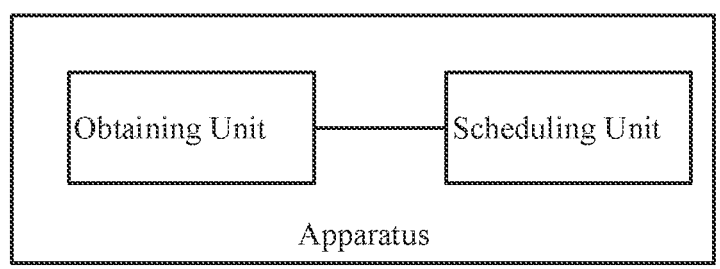
FIG. 9 is a block diagram of another apparatus provided by an embodiment of the present disclosure.

Refer to FIG. 9, which is a block diagram of another apparatus provided by an embodiment of the present disclosure. The apparatus is applied to a network device, and can include an obtaining unit and a scheduling unit.

The obtaining unit is configured to obtain a number M of time slices in an outbound-interface-direction-queue scheduling period corresponding to an outbound interface on said network device, where the M is determined based on a length of one time slice corresponding to the outbound interface and a designated one-hop delay; the length of one time slice is determined based on a bandwidth of the outbound interface and the designated packet length; the outbound-interface-direction-queue scheduling period is used to schedule N outbound-interface-direction queues corresponding to the outbound interface; different outbound interface directions correspond to different service attributes; and N is greater than or equal to 1; and obtain corresponding time slices in the outbound-interface-direction-queue scheduling period allocated by a management device for the outbound-interface-direction queues.

The scheduling unit is configured to schedule, on each time slice in the outbound-interface-direction-queue scheduling period, packets in an outbound-interface-direction queue corresponding to the time slice, where a total number of the time slices allocated to a number N of outbound-interface-direction queues is a number M of time slices.

Optionally, the scheduling unit is further configured to: receive a first packet sent by a terminal that has accessed to the network device; encapsulate a segment route SR header for the first packet, where the SR header includes: a target outbound interface, an identifier of a target outbound-interface-direction queue corresponding to the target outbound interface and corresponding to a first service attribute matching with the first packet, and an identifier of a target time slice corresponding to the target outbound-interface-direction queue, of each hop on the first packet forwarding path for forwarding the first packet, and the target outbound interface, the identifier of the target outbound-interface-direction queue, and the identifier of the target time slice corresponding to the target outbound-interface-direction queue of each hop on the first packet forwarding path included in the SR header is used to instruct a further network device on the first forwarding path that receive the first packet to refer to the target outbound interface, the identifier of the target outbound-interface-direction queue and the identifier of the target time slice in the SR header to forward the first packet.

Optionally, the scheduling unit is further configured to: receive a second packet forwarded by a further network device; where the encapsulated SR header for the second packet includes: a target outbound interface, an identifier of a target outbound-interface-direction queue corresponding to the target outbound interface and corresponding to a second service attribute matching with the second packet, and a time slice identifier of a target time slice corresponding to the target outbound-interface-direction queue, of each hop on a second forwarding path for forwarding the second packet; obtain a local target outbound interface and the identifier of the target outbound-interface-direction queue corresponding to the local target outbound interface which belongs to the said network device from the SR header encapsulated for the second packet; if a number of packets in the target outbound-interface-direction queue corresponding to the obtained identifier of the target outbound-interface-direction queue is larger than or equal to a preset packet number threshold, send a congestion notification to the first network device on the second forwarding path, such that the first network device subsequently inhibits forwarding other packets matching with the second service attribute through the second forwarding path; and if subsequently detecting that the number of packets in the target outbound-interface-direction queue changes to be smaller than the preset packet number threshold from being greater than or equal to the preset packet number threshold, send a congestion cancellation notification to the first network device, such that the first network device subsequently forwards other packets matching with the second service attribute through the second forwarding path.

So far, the structure of the apparatus shown in FIG. 9 has been completed.

Figure 10:
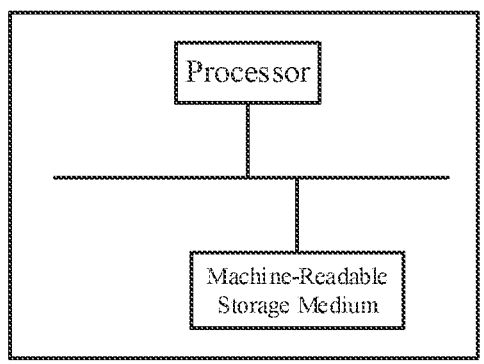
FIG. 10 is a block diagram of hardware of an apparatus provided by an embodiment of the present disclosure.

Correspondingly, an embodiment of the present disclosure also provides the hardware structure of the apparatus shown in FIG. 8 or FIG. 9. As shown in FIG. 10, the hardware structure can include: a machine-readable storage medium and a processor.

The machine-readable storage medium stores instruction codes.

The processor communicates with the machine-readable storage medium, reads and executes instruction codes in the machine-readable storage medium, to implement the packet forwarding method provided in the present disclosure.

So far, the hardware structure illustration of the apparatus shown in FIG. 10 has been completed.

In the present disclosure, the machine-readable storage medium can be any electronic, magnetic, optical or other physical storage apparatus, and can contain or store information, such as executable instructions, data, and so on. For example, the machine-readable storage medium can be a random access memory (RAM), a volatile memory, a non-volatile memory, a flash memory, a storage driver (such as a hard drive), a solid state driver, and any type of storage disk (such as CD, DVD, etc.), or similar storage medium, or a combination of them.

The apparatuses, modules or units illustrated in the above embodiments can be specifically implemented by computer chips or entities, or implemented by products with certain functions. A typical implementation device is a computer. The specific form of the computer can be a personal computer, a laptop computer, a cellular phone, a camera phone, a smart phone, a personal digital assistant, a media player, a navigation device, an email receiving and sending device, and a game console, a tablet computer, a wearable device, or a combination of any of these devices.

For the convenience of description, when describing the apparatus, the functions are divided into various units and described separately. Of course, when practicing the present disclosure, the functions of each unit can be implemented in the same or multiple components of software and/or hardware.

Those skilled in the art should understand that the embodiments of the present disclosure can be provided as methods or computer program products. Therefore, the present disclosure can adopt the form of a complete hardware embodiment, a complete software embodiment, or an embodiment combining software and hardware. Moreover, the embodiments of the present disclosure can take the form of computer program products implemented on one or more computer-usable storage media (including but not limited to disk storage, CD-ROM, optical storage, or the like) containing computer-usable program codes.

The present disclosure refers to the flowchart and/or block diagram of the method, the apparatus (system), and the computer program product according to the embodiments of the present disclosure. It should be understood that each process and/or block in the flowchart and/or block diagram, and the combination of processes and/or blocks in the flowchart and/or block diagram can be realized by computer program instructions. These computer program instructions can be provided to a processor of a general-purpose computer, a special-purpose computer, an embedded processor, or other programmable data processing device to generate a machine, such that the instructions executed by the processor of the computer or other programmable data processing device are generated an apparatus that implements the functions designated in one or more processes in the flowchart and/or one or more blocks in the block diagram.

Moreover, these computer program instructions can also be stored in a computer-readable memory which can guide a computer or other programmable data processing device to operate in a specific manner, such that the instructions stored in the computer-readable memory produce an article of manufacture including an instruction apparatus, which implements the functions designated in one or more processes in the flowchart and/or one or more blocks in the block diagram.

These computer program instructions can also be loaded on a computer or other programmable data processing device, such that a series of operation steps are executed on a computer or other programmable device to produce computer-implemented processing, such that the instructions executed on the computer or other programmable device provide steps to implement the functions designated in one or more processes in the flowchart and/or one or more blocks in the block diagram.

The above descriptions are only the preferred embodiments of the present disclosure and are not intended to limit the present disclosure. Any modification, equivalent replacement, improvement, and the like made within the spirit and principle of the present disclosure shall be included within the protection scope of the present disclosure.

The invention claimed is:

1. A packet forwarding method, the method being applied to a management device, and the management device being configured to manage at least one network device, and the method comprising:
   determining a length of one time slice corresponding to an outbound interface based on a bandwidth of the outbound interface on the network device which is used to forward a packet and a designated packet length;
   determining a number M of time slices in an outbound-interface-direction-queue scheduling period corresponding to the outbound interface based on the length of one time slice and a designated one-hop delay, wherein M is greater than or equal to 1; the outbound-interface-direction-queue scheduling period is used to schedule N outbound-interface-direction queues corresponding to the outbound interface; N is greater than or equal to 1; different outbound-interface-direction queues correspond to different service attributes;
   allocating, based on service attributes corresponding to outbound-interface-direction queues, corresponding time slices in the outbound-interface-direction-queue scheduling period to the outbound-interface-direction queues, such that the network device, on each time slice in the outbound-interface-direction-queue scheduling period, schedules packets in an outbound-interface-direction queue corresponding to the time slice, wherein a total number of time slices allocated to the N outbound-interface-direction queues is M time slices,
   wherein before the network device forwards a packet sent by a terminal to which the network device has accessed, the method further comprises:
   determining a forwarding path for forwarding the packet;
   notifying the network device of a target outbound interface, an identifier of the target outbound-interface-direction queue corresponding to the target outbound interface and corresponding to a service attribute matching with the packet, and an identifier of a target time slice corresponding to the target outbound-interface-direction queue on each hop of the forwarding path, for the network device to append the target outbound interface, the identifier of the target outbound-interface-direction queue corresponding to the target outbound interface and corresponding to the service attribute matching with the packet, and the identifier of the target time slice corresponding to the target outbound-interface-direction queue on each hop of the forwarding path to a segment route SR header, to instruct a further network device on the forwarding path that receive the packet to directly refer to the target outbound interface, the identifier of the target outbound-interface-direction queue and the identifier of the target time slice appended in the SR header to forward the packet.

2. The method of claim 1, wherein determining a length of one time slice corresponding to an outbound interface based on a bandwidth of the outbound interface on the network device which is used to forward a packet and a designated packet length comprises:
   determining a reference value for calculating a length of one time slice based on the designated packet length; and determining the length of one time slice based on the reference value, the designated packet length and the bandwidth of the outbound interface and determining the length of one time slice in accordance with a preset equation for calculating the length of one time slice.

3. The method of claim 2, wherein the preset equation for calculating the length of one time slice is:

(8+Frame+IFG)*8)/Bandwidth;

where Frame is the designated packet length, IFG is the reference value, when the packet length is an integer multiple of 4 bytes, IFG is a first value, otherwise, IFG is a second value; and Bandwidth is the bandwidth of the outbound interface.

4. The method of claim 1, wherein the designated packet length is 64 bytes, 512 bytes, 2K bytes or 1518 bytes.

5. The method of claim 1, wherein determining a number M of time slices in an outbound-interface-direction-queue scheduling period corresponding to the outbound interface based on the length of one time slice and a designated one-hop delay comprises:
calculating a quotient of the designated one-hop delay and the length of one time slice;
if the quotient is $2^x$ and x is any positive integer, determining the quotient to be the M; and
if the quotient is not $2^x$, then determining $2^k$ closest to the quotient, and determining $2^k$ to be the M.

6. The method of claim 1, wherein allocating, based on service attributes corresponding to outbound-interface-direction queues, corresponding time slices in the outbound-interface-direction-queue scheduling period to the outbound-interface-direction queues comprises:
for each of the outbound-interface-direction queues, obtaining a delay requirement corresponding to a service attribute based on the service attribute corresponding to the outbound-interface-direction queue, where the delay requirement includes a required target delay;
obtaining a maximum transmission unit MTU configured for the outbound-interface-direction queue;
allocating, based on the obtained delay requirement and the MTU, a corresponding time slice in the outbound-interface-direction-queue scheduling period to the outbound-interface-direction queue.

7. The method of claim 6, wherein allocating, based on the obtained delay requirement and the MTU, a corresponding time slice in the outbound-interface-direction-queue scheduling period to the outbound-interface-direction queue comprises:
when the target delay is smaller than or equal to a preset delay threshold, if the MTU configured for the outbound-interface-direction queue is shorter than or equal to the designated packet length, allocating time slices separated by the target delay in one outbound-interface-direction-queue scheduling period to the outbound-interface-direction queue; and if the MTU configured for the outbound-interface-direction queue is longer than the designated packet length, allocating time slice groups separated by the target delay in one outbound-interface-direction-queue scheduling period to the outbound-interface-direction queue, where the time slice group includes L adjacent time slices, and L is the number of time slices occupied by the MTU configured for the outbound-interface-direction queue; and
when the target delay is larger than a preset delay threshold, if the MTU configured for the outbound-interface-direction queue is shorter than or equal to the designated packet length, allocating a number P1 of time slices in one outbound-interface-direction-queue scheduling period to the outbound-interface-direction queue; and if the MTU configured for the outbound-interface-direction queue is longer than the designated packet length, allocating a number P2 of time slice groups in one outbound-interface-direction-queue scheduling period to the outbound-interface-direction queue, where P1 is larger than or equal to 1, and if P1 is greater than 1, the P1 time slices are scattered; P2 is larger than or equal to 1, and if P2 is greater than 1, the P2 time slice groups are scattered; one time slice group includes L adjacent time slices, and L is the number of time slices occupied by the MTU.

8. A packet forwarding method, the method being applied to a network device, and comprising:
obtaining a number M of time slices in an outbound-interface-direction-queue scheduling period corresponding to an outbound interface on the network device, wherein the M is determined based on a length of one time slice corresponding to the outbound interface and a designated one-hop delay; the length of one time slice is determined based on a bandwidth of the outbound interface and the designated packet length; the outbound-interface-direction-queue scheduling period is used to schedule N outbound-interface-direction queues corresponding to the outbound interface; different outbound interface directions correspond to different service attributes; and N is greater than or equal to 1;
obtaining corresponding time slices in the outbound-interface-direction-queue scheduling period allocated by a management device for the outbound-interface-direction queues; and scheduling, on each time slice in the outbound-interface-direction-queue scheduling period, packets in an outbound-interface-direction queue corresponding to the time slice, wherein a total number of the time slices allocated to a number N of outbound-interface-direction queues is a number M of time slices;
receiving a first packet sent by a terminal that has accessed to the network device;
encapsulating a segment route SR header for the first packet, wherein the SR header includes: a target outbound interface, an identifier of a target outbound-interface-direction queue corresponding to the target outbound interface and corresponding to a first service attribute matching with the first packet, and an identifier of a target time slice corresponding to the target outbound-interface-direction queue, of each hop on the first packet forwarding path for forwarding the first packet, and the target outbound interface, the identifier of the target outbound-interface-direction queue, and the identifier of the target time slice corresponding to the target outbound-interface-direction queue of each hop on the first packet forwarding path included in the SR header is used to instruct a further network device on the first forwarding path that receive the first packet to refer to the target outbound interface, the identifier of the target outbound-interface-direction queue and the identifier of the target time slice in the SR header to forward the first packet.

9. The method of claim 8, further comprising:
receiving a second packet forwarded by a further network device; wherein the encapsulated SR header for the second packet includes: a target outbound interface, an identifier of a target outbound-interface-direction queue corresponding to the target outbound interface and corresponding to a second service attribute matching with the second packet, and a time slice identifier of a target time slice corresponding to the target outbound-interface-direction queue, of each hop on a second forwarding path for forwarding the second packet;

obtaining a local target outbound interface and an identifier of a target outbound-interface-direction queue corresponding to the local target outbound interface which belongs to the present network device from the SR header encapsulated for the second packet;

if a number of packets in the target outbound-interface-direction queue corresponding to the obtained identifier of the target outbound-interface-direction queue is larger than or equal to a preset packet number threshold, sending a congestion notification to the first network device on the second forwarding path, such that the first network device subsequently inhibits forwarding other packets matching with the second service attribute through the second forwarding path; and if subsequently detecting that the number of packets in the target outbound-interface-direction queue changes to be smaller than the preset packet number threshold from being greater than or equal to the preset packet number threshold, sending a congestion cancellation notification to the first network device, such that the first network device subsequently forwards other packets matching with the second service attribute through the second forwarding path.

10. An electronic device, comprising: a machine-readable storage medium and a processor; wherein
the machine-readable storage medium stores instruction codes; and
the processor communicates with the machine-readable storage medium, reads and executes instruction codes in the machine-readable storage medium, to implement:
determining a length of one time slice corresponding to an outbound interface based on a bandwidth of the outbound interface on the network device which is used to forward a packet and a designated packet length;
determining a number M of time slices in an outbound-interface-direction-queue scheduling period corresponding to the outbound interface based on the length of one time slice and a designated one-hop delay, wherein M is greater than or equal to 1; the outbound-interface-direction-queue scheduling period is used to schedule N outbound-interface-direction queues corresponding to the outbound interface; N is greater than or equal to 1; different outbound-interface-direction queues correspond to different service attributes;
allocating, based on service attributes corresponding to outbound-interface-direction queues, corresponding time slices in the outbound-interface-direction-queue scheduling period to the outbound-interface-direction queues, such that the network device, on each time slice in the outbound-interface-direction-queue scheduling period, schedules packets in an outbound-interface-direction queue corresponding to the time slice, wherein a total number of time slices allocated to the N outbound-interface-direction queues is M time slices,
wherein before the network device forwards a packet sent by a terminal to which the network device has accessed, the processor communicates with the machine-readable storage medium, reads and executes instruction codes in the machine-readable storage medium, to implement:
determining a forwarding path for forwarding the packet;
notifying the network device of a target outbound interface, an identifier of the target outbound-interface-direction queue corresponding to the target outbound interface and corresponding to a service attribute matching with the packet, and an identifier of a target time slice corresponding to the target outbound-interface-direction queue on each hop of the forwarding path, for the network device to append the target outbound interface, the identifier of the target outbound-interface-direction queue corresponding to the target outbound interface and corresponding to the service attribute matching with the packet, and the identifier of the target time slice corresponding to the target outbound-interface-direction queue on each hop of the forwarding path to a segment route SR header, to instruct a further network device on the forwarding path that receive the packet to directly refer to the target outbound interface, the identifier of the target outbound-interface-direction queue and the identifier of the target time slice appended in the SR header to forward the packet.

11. The electronic device of claim 10, wherein determining a length of one time slice corresponding to an outbound interface based on a bandwidth of the outbound interface on the network device which is used to forward a packet and a designated packet length comprises:
determining a reference value for calculating a length of one time slice based on the designated packet length; and
determining the length of one time slice based on the reference value, the designated packet length and the bandwidth of the outbound interface and determining the length of one time slice in accordance with a preset equation for calculating the length of one time slice.

12. The electronic device of claim 11, wherein the preset equation for calculating the length of one time slice is:

$$(8+\text{Frame}+\text{IFG})*8/\text{Bandwidth};$$

where Frame is the designated packet length, IFG is the reference value, when the packet length is an integer multiple of 4 bytes, IFG is a first value, otherwise, IFG is a second value; and Bandwidth is the bandwidth of the outbound interface.

13. The electronic device of claim 10, wherein the designated packet length is 64 bytes, 512 bytes, 2K bytes or 1518 bytes.

14. The electronic device of claim 10, wherein determining a number M of time slices in an outbound-interface-direction-queue scheduling period corresponding to the outbound interface based on the length of one time slice and a designated one-hop delay comprises:
calculating a quotient of the designated one-hop delay and the length of one time slice;
if the quotient is $2^x$ and x is any positive integer, determining the quotient to be the M; and
if the quotient is not $2^x$, then determining $2^k$ closest to the quotient, and determining $2^k$ to be the M.

15. The electronic device of claim 10, wherein allocating, based on service attributes corresponding to outbound-interface-direction queues, corresponding time slices in the outbound-interface-direction-queue scheduling period to the outbound-interface-direction queues comprises:

for each of the outbound-interface-direction queues, obtaining a delay requirement corresponding to a service attribute based on the service attribute corresponding to the outbound-interface-direction queue, where the delay requirement includes a required target delay;

obtaining a maximum transmission unit MTU configured for the outbound-interface-direction queue;

allocating, based on the obtained delay requirement and the MTU, a corresponding time slice in the outbound-interface-direction-queue scheduling period to the outbound-interface-direction queue.

16. The electronic device of claim 15, wherein allocating, based on the obtained delay requirement and the MTU, a corresponding time slice in the outbound-interface-direction-queue scheduling period to the outbound-interface-direction queue comprises:

when the target delay is smaller than or equal to a preset delay threshold, if the MTU configured for the outbound-interface-direction queue is shorter than or equal to the designated packet length, allocating time slices separated by the target delay in one outbound-interface-direction-queue scheduling period to the outbound-interface-direction queue; and if the MTU configured for the outbound-interface-direction queue is longer than the designated packet length, allocating time slice groups separated by the target delay in one outbound-interface-direction-queue scheduling period to the outbound-interface-direction queue, where the time slice group includes L adjacent time slices, and L is the number of time slices occupied by the MTU configured for the outbound-interface-direction queue; and when the target delay is larger than a preset delay threshold, if the MTU configured for the outbound-interface-direction queue is shorter than or equal to the designated packet length, allocating a number P1 of time slices in one outbound-interface-direction-queue scheduling period to the outbound-interface-direction queue; and if the MTU configured for the outbound-interface-direction queue is longer than the designated packet length, allocating a number P2 of time slice groups in one outbound-interface-direction-queue scheduling period to the outbound-interface-direction queue, where P1 is larger than or equal to 1, and if P1 is greater than 1, the P1 time slices are scattered; P2 is larger than or equal to 1, and if P2 is greater than 1, the P2 time slice groups are scattered; one time slice group includes L adjacent time slices, and L is the number of time slices occupied by the MTU.

17. An electronic device, comprising: a machine-readable storage medium and a processor; wherein the machine-readable storage medium stores instruction codes; and the processor communicates with the machine-readable storage medium, reads and executes instruction codes in the machine-readable storage medium, to implement the method of claim 1.

* * * * *